United States Patent [19]

Ledvina

[11] Patent Number: 4,569,671
[45] Date of Patent: Feb. 11, 1986

[54] METAL CHAIN-BELT

[75] Inventor: Timothy J. Ledvina, Ithaca, N.Y.

[73] Assignee: Borg-Warner Corporation, Chicago, Ill.

[21] Appl. No.: 672,238

[22] Filed: Nov. 16, 1984

[51] Int. Cl.⁴ .............................................. F16G 1/00
[52] U.S. Cl. .................................. 474/201; 474/242; 474/245
[58] Field of Search ................ 474/201, 242, 244, 245

[56] References Cited

U.S. PATENT DOCUMENTS

| 3,364,767 | 1/1968 | Bredschneider et al. | 474/245 |
| 3,720,113 | 3/1973 | Van Doorne et al. | 474/242 |
| 4,313,730 | 2/1982 | Cole et al. | 474/201 |
| 4,337,057 | 6/1982 | Harowitz et al. | 474/242 |
| 4,349,343 | 9/1982 | Stephanoff et al. | 474/245 |
| 4,386,922 | 6/1983 | Ivey | 474/242 |
| 4,516,963 | 5/1985 | Mott | 474/245 |

Primary Examiner—James A. Leppink
Assistant Examiner—Frank McKenzie
Attorney, Agent, or Firm—James A. Geppert

[57] ABSTRACT

A chain-belt comprising a plurality of interleaved sets of links and load blocks associated therewith. Each link is defined by toes, the toes of each link being defined by parallel inside flanks joined by a crotch. A load block is received between the inside flanks and further a hardened insert is located between the links and the blocks to protect the links and improve the durability of the chain.

5 Claims, 8 Drawing Figures

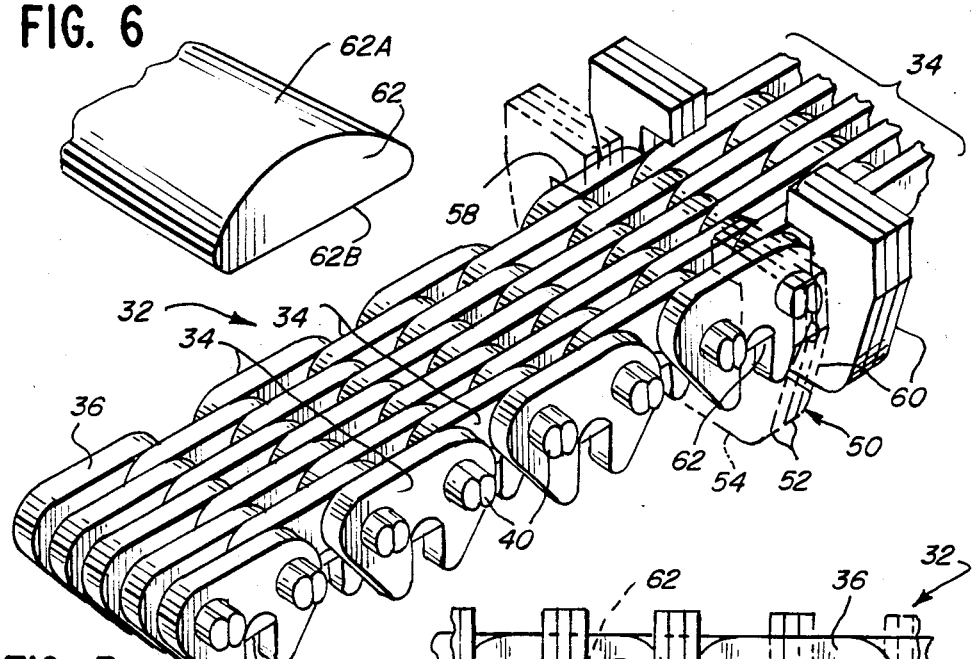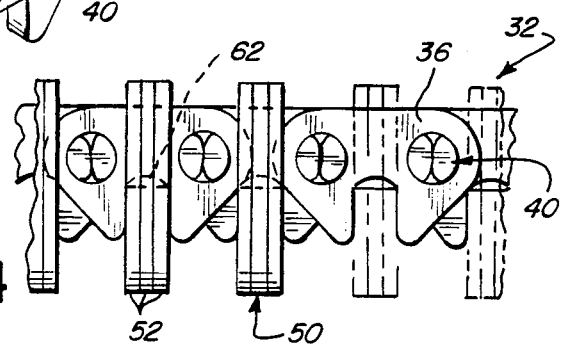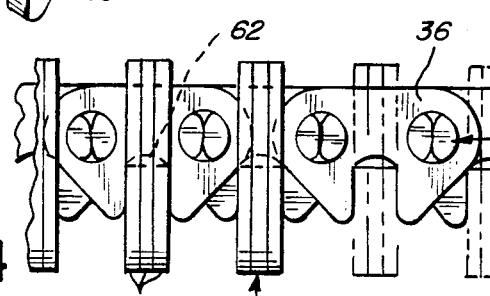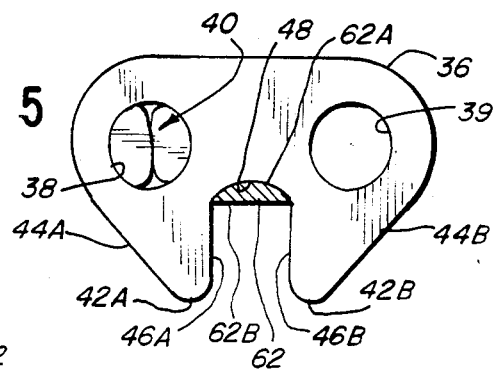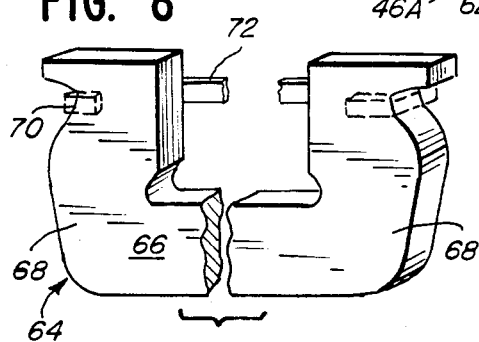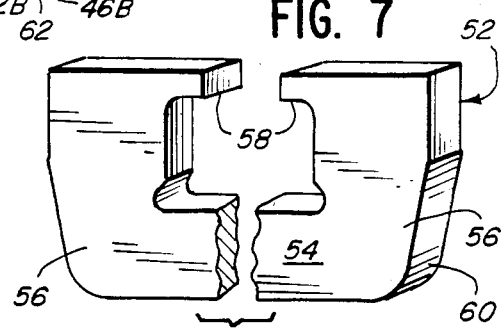

METAL CHAIN-BELT

BACKGROUND OF THE INVENTION

1. Field of the Invention

This invention relates to metal chain-belts especially adapted to connect the pulleys of a pulley transmission, particularly a continuously variable transmission (CVT), and broadly comprises a tension member or carrier constructed of a plurality of interlaced links arranged in transverse sets with the adjacent sets joined by pivot means, and load blocks carried by the carrier for engaging the pulleys.

2. Background Information

Variable pulley transmissions for transferring torque from an input or drive shaft to an output or driven shaft have been used for some time. In these transmissions, a first pulley constructed of a pair of flanges, at least one of which is conical, is mounted on the input shaft such that at least one of its flanges is axially movable with respect to its other flange. A second, similarly constructed and adjustable pulley is mounted on the output shaft. A flexible belt connects the two pulleys to transfer torque therebetween when the input shaft is driven. As the effective diameter of one pulley is changed, the effective diameter of the other pulley is changed in the other direction and, the drive ratio between the input and output shafts is adjusted in a smooth, continuous manner.

Automotive engineers have long recognized that the maximum operating efficiency of the engine could be achieved if the transmission could be controlled by adjusting to different loads and speed ratios, such that the engine is maintained and operated at its maximum efficiency operating conditions. This has not been possible when a conventional geared transmission is teamed with an engine. In the conventional geared transmission, the drive ratio is adjusted in discrete steps, rather than continuously. Accordingly, efforts have been directed to the use of a continuously variable transmission (CVT) of the type described above. The efforts have resulted in the production and marketing in Europe of the DAF passenger car, using flexible, continuous rubber belt to drivingly interconnect the pulleys. Rubber belts have been considered to be inferior to metal belts because of various adverse conditions under which they must operate. More recently, Fiat and Volvo have produced automobiles incorporating CVTs using respectively, metal belts and rubber belts. Some of the efforts to produce metal belts which are durable, relatively quiet in operation, and also economical to market, are described in the patent and other literature.

Flexible metal belts for use in CVTs are generally of two varieties, those referred to as "push" belts and those referred to as "pull" belts. Push belts are currently being used in the Fiat automobile's CVT. An example of a push belt is described in Van Doorne et al U.S. Pat. No. 3,720,113 and an example of a pull belt is described in Cole, Jr. et al U.S. Pat. No. 4,313,730. The Van Doorne et al belt comprises an endless carrier constructed of a plurality of nested metal bands and an endless array of generally trapezoidal (when viewed from the front) load blocks encircling the carrier and longitudinally movable therealong. Each block has edge surfaces engaging the pulley's flanges of a pulley transmission to transmit torque between the pulleys. The pull belt of Cole, Jr. et al utilizes an endless chain as the carrier, the sets of links of which are pivotably interconnected by pivot means. Load blocks, similar to those of Van Doorne et al, encircle the links; however the load blocks are constrained against longitudinal movement along the chain by the pivot means.

The push belt as described in relatively expensive to manufacture and must be installed and/or replaced as a complete, endless loop. Thus disassembly of parts of the pulley transmission is required, not only for the initial assembly, but also for replacement due to failure of one or more load blocks or one or more of the carrier bands.

The pull belt offers a less expensive alternative to the push belt. No precise matching of carrier parts is required. The belt can be assembled with a finite length, positioned around the pulleys, and the ends then connected by a pivot member. Thus disassembly of the pulleys is not required in either for initial installation or replacement of a belt.

Theoretically a load block, either on a push belt or pull belt, enters a pulley tangentially, so that the block is radially oriented with respect to the pulley. Actually, the block can tilt and probably enters the pulley at some other angle. When the load blocks tilt, at least one of the defining walls, usually the bottom wall, of the block's "window" or "windows", i.e., the opening or openings in which the carrier is located, digs into the carrier and damages the carrier. This damage can become so severe as to seriously weaken the carrier which leads to its premature failure. The idea of making the defining lower (and at times the upper) defining wall of the window or windows slightly round or arcuate from front-to-back has been suggested but has not been proven to be successful to aleviate the problem.

SUMMARY OF THE INVENTION

A metal power transmission chain-belt especially adaptable for connecting the pulleys of a pulley transmission is provided which comprises a tensile member constructed of a plurality of interleaved or laced sets of links, each set having a plurality of transversely arranged links. The links resemble those of a silent chain, and are each defined by a pair of spaced toes which in turn are each defined by an inside flank and an outside flank. Pivot means join the adjacent sets of links to form an endless loop. The inside flanks of the links are spaced from and substantially parallel to one another, and each space defined by the inside flanks receives a back portion of a generally U-shaped load block which traverses the set of links. Each load block has edges adapted to contact the pulleys of the pulley transmission and each has a thickness which substantially fills the space between the link's toes, so that the block is substantially fixed in position relative to its set of links.

Any mechanical or working load on the blocks is thus transferred to the tensile member. To further strengthen the assembly, a hardened steel insert is positioned between the transverse span of the load blocks and the links. The load blocks can be formed with "wings" which overlie at least portions of the links to retain them in position or can be so shaped to accommodate a spring clip traversing the tensile member for the same purpose. They can also be constructed to receive a transversely disposed connecting bar member as is well known in the art.

BRIEF DESCRIPTION OF THE DRAWINGS

FIG. 3 is an isometric illustration of a segment of a chain-belt constructed according to this invention;

FIG. 4 is a side view of a segment of the chain-belt of FIG. 3;

FIG. 5 is an illustration of a link useable in the tensile member of the chain-belt of FIG. 3;

FIG. 6 is an isometric view of a portion of a transverse member useable in the chain-belt of this invention; and FIGS. 7 and 8 are isometric views of load block plates useable in the chain-belt of FIGS. 3 and 4.

DESCRIPTION OF THE PREFERRED EMBODIMENT

Figure 1:
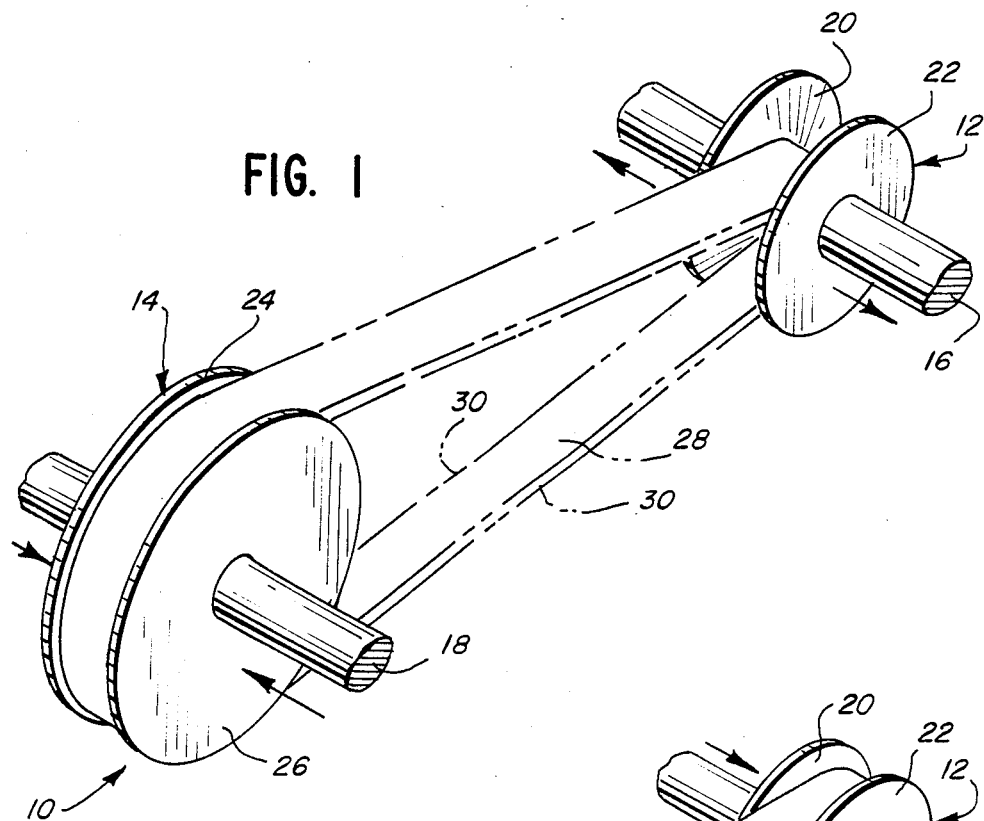
FIGS. 1 and 2 are schematic illustrations of a continuously variable transmission (CVT) in two extreme drive ratios.
Figure 2:
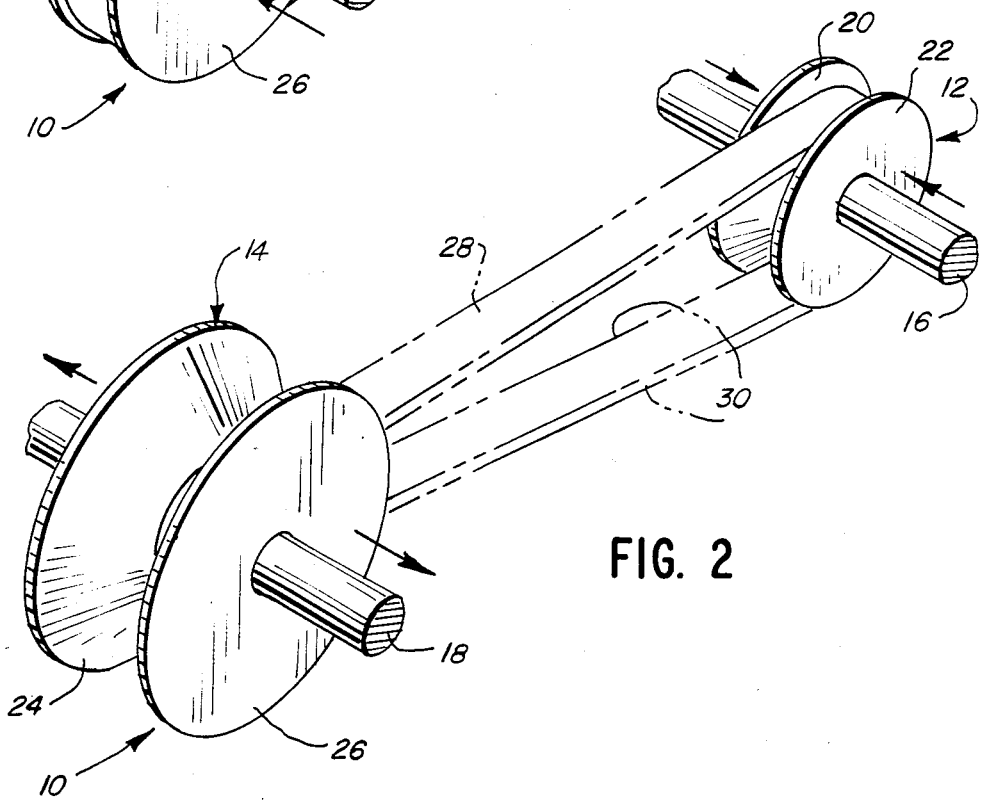

FIGS. 1 and 2 illustrate schematically a CVT 10 in two drive ratios. CVT 10 comprises a pair of pulleys 12 and 14 connected respectively to shafts 16 and 18, one of which is the driven shaft and the other of which is the drive shaft. Pulley 12 comprises a pair of flanges 20, 22, at least one of which is conical, and pulley 14 comprises a pair of flanges 24, 26, at least one of which is conical. The pulleys are connected by a belt 28, the side edges 30 of which frictionally engage the pulley flanges. At least one flange of each pulley is axially movable with respect to the other, so as to vary the drive ratios between the pulleys. The arrows indicate the axial movement of the flanges to effect the different drive ratios. Means—beyond the scope of this invention—can be provided for axially moving at least one flange relative to the other.

The chain-belt of this invention is identified as 32 (see FIGS. 3 and 4 showing segments of the chain belt 32) and comprises a plurality of interleaved or laced sets 34 of links 36, each link having a pair of spaced apertures 38, 39. The apertures are arranged so that pivot means 40 join adjacent sets of links to thus permit the chain-belt to articulate. Pivot means 40 are shown as being of the pin and rocker variety but any known type of pivot means may be used. Because of the lacing, alternate sets of links have a different number of links than the other sets of links.

Each link 36 (see also FIG. 5) has a pair of toes 42A, 42B which are defined by outside flanks 44A, 44B and inside flanks 46A, 46B. The inside flanks are spaced from and generally parallel to one another, and are joined by a curved crotch 48.

A load block 50 is associated with each set of links and is received between the inside flanks 46A, 46B. Usually, the block fills the space between the flanks and is substantially fixed in position relative to the flanks. Each block 50 is generally U-shaped and constructed of several plates 52 which can be stamped from sheet stock. Thus when used herein, the expression load blocks means a solid member or a plurality of relatively thin plates.

Block plate 52 (FIG. 7) comprises a generally central back or bottom portion 54 and extending arms 56, 56 terminating in inwardly directed tabs 58, 58. In the chain-belt, the back portions of several block plates 52 comprising a block 50 are received between the link's flanks 46A, 46B while the arms 56, 56 of each block plate embrace the outside of the links in the set of links. The tabs 58, 58 extend over at least a portion of the set of links for retaining the load block 50 in position. The outside edges 60, 60 of the arms 56, 56 are shaped to engage the flanges of the pulleys. Thus the blocks when viewed from the front present a generally trapezoidal shape to the eye. In addition, a hardened metal insert 62 (see also FIG. 6) having one surface 62A shaped to fit the link's crotch 48 is provided in the assembly and is located between the link and the portions 54 of the block plates. The insert 62 presents a flat surface 62B to the portions 54 of the plates 52. This insert functions as a bearing member and substantially eliminates notching of the links caused by contact of the links and with the blocks. The use of inserts 62 thus enhance the durability of the assembly.

A block constructed of plates 64 illustrated in FIG. 8 may also be used. Plate 64 is generally U-shaped with a generally central back or bottom section 66 and arms 68, 68. In lieu of tabs to fit over the links, arms 68, 68 are indented at 70 to receive the ends of spring-type clips 72 (also shown in FIG. 8) which span the links of a set and retain the block or its plate in position. The other constructional features are the same as those for blocks 50.

The appended claims are intended to cover all reasonable equivalents of the recited structure.

I claim:

1. A metal power transmission chain-belt especially adaptable for connecting the pulleys of a pulley transmission comprising:
   a plurality of interleaved sets of links, each set having a plurality of transversely arranged links;
   pivot means joining the adjacent sets of links to form an endless loop;
   each link in at least some sets of links having a pair of spaced toes, the toes of which are defined by generally straight and substantially parallel inside flanks;
   a plurality of generally U-shaped load blocks, each block being associated with a set of links wherein the toes are defined by said generally straight inside flanks, each block having a central portion located between the toes of a set of links so defined and having edge surfaces for contacting the pulleys of the transmission; and
   an insert means positioned between each load block and each link so defined and located between said toes, each insert forming a bearing surface for its respective load block.

2. A metal power transmission chain-belt as recited in claim 1, wherein each said insert means comprises a hardened steel bar-like member.

3. A metal power transmission chain as recited in claim 1, further comprising means for retaining each load block in position.

4. A metal power transmission chain as recited in claim 3, in which each load block has inwardly directed tabs spaced from said central portion which extend over at least some links for retaining it in position.

5. A metal power transmission chain as recited in claim 3 further comprising a clip means engaging each load block for retaining said load block in position, each clip means transversely spanning a set of links.

* * * * *